United States Patent
Joshi et al.

(10) Patent No.: US 7,437,426 B2
(45) Date of Patent: Oct. 14, 2008

(54) DETECTING AND CORRECTING NODE MISCONFIGURATION OF INFORMATION ABOUT THE LOCATION OF SHARED STORAGE RESOURCES

(75) Inventors: Sameer Joshi, San Jose, CA (US);
Surojit Chatterjee, Cambridge, MA (US); Ken Lee, San Jose, CA (US);
Jonathan Creighton, Oakland, CA (US); Alok Srivastava, Newark, CA (US)

(73) Assignee: Oracle International Corporation, Redwood Shores, CA (US)

( * ) Notice: Subject to any disclaimer, the term of this patent is extended or adjusted under 35 U.S.C. 154(b) by 554 days.

(21) Appl. No.: 11/237,191

(22) Filed: Sep. 27, 2005

(65) Prior Publication Data

US 2007/0073855 A1 Mar. 29, 2007

(51) Int. Cl.
*G06F 15/16* (2006.01)
(52) U.S. Cl. ........................................ 709/213; 709/224
(58) Field of Classification Search ......... 709/200–202, 709/213–224
See application file for complete search history.

(56) References Cited

U.S. PATENT DOCUMENTS

| | | | |
|---|---|---|---|
| 6,298,419 B1 * | 10/2001 | Kontothanassis et al. .... | 711/147 |
| 6,950,833 B2 * | 9/2005 | Costello et al. ............. | 707/201 |
| 7,197,632 B2 * | 3/2007 | Rao et al. ....................... | 713/1 |
| 7,266,722 B2 * | 9/2007 | Kingsbury .................... | 714/15 |
| 2003/0079155 A1 * | 4/2003 | Kingsbury ..................... | 714/2 |
| 2003/0167322 A1 * | 9/2003 | Butterworth et al. ........ | 709/223 |
| 2003/0221149 A1 * | 11/2003 | Vollrath ...................... | 714/724 |
| 2005/0125461 A1 * | 6/2005 | Filz ............................ | 707/203 |
| 2007/0022138 A1 * | 1/2007 | Erasani et al. ........... | 707/104.1 |
| 2007/0022314 A1 * | 1/2007 | Erasani et al. ................ | 714/4 |
| 2008/0005196 A1 * | 1/2008 | Beck .......................... | 707/203 |

* cited by examiner

*Primary Examiner*—Moustafa M Meky
(74) *Attorney, Agent, or Firm*—Hickman Palermo Truong & Becker LLP (57) ABSTRACT

A group of shared-storage resources are being maintained as replicas by the nodes of a cluster. Each node in the cluster maintains a set of pointers to the members of the group. As membership changes, the set of pointers should be changed accordingly. For various, reasons, the set of pointers of a node are not changed and may point to shared-storage resources that are no longer members of the group and/or not point to shared-storage resources that are members of the group. By recording a history of membership changes in the shared-storage resources, and comparing the recording to what a node thinks the shared resources should be, an incorrect set of pointers can be detected and corrective active undertaken.

18 Claims, 5 Drawing Sheets

DETECTING AND CORRECTING NODE MISCONFIGURATION OF INFORMATION ABOUT THE LOCATION OF SHARED STORAGE RESOURCES

RELATED APPLICATION

This application is related to U.S. patent Ser. No. 10/253,088, entitled Persistent Key-Value Repository with a Pluggable Architecture to Abstract Physical Storage, filed by Surojit Chatterjee, et al. on Sep. 23, 2002, the contents of which are herein incorporated by reference as if originally set forth herein.

FIELD OF THE INVENTION

The present invention relates to maintaining replicas of bodies of data, and in particular, maintaining the availability of the replicas among nodes of a multi-node computer system.

BACKGROUND OF THE INVENTION

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Many enterprise data processing systems rely on clustered database servers to store and manage data. A clustered database server runs on a cluster of nodes. The nodes in a group may be in the form of computers (e.g. work stations, personal computers) interconnected via a network. Alternatively, the nodes may be the nodes of a grid, where each node is interconnected on a rack. Each node in a cluster shares direct access to shared-storage resources, such as a set of disks, or a file stored on the disk.

Some shared-storage resources are critical to the operation of the cluster and/or critical to the functioning of software hosted on the cluster. An example of such a shared-storage resource is a cluster registry, which stores information about the configuration of the cluster and/or the configuration of a database server hosted on the cluster. Each node in the cluster maintains a pointer to the cluster registry so that they may access it.

The term pointer refers to any data that identifies the storage location of a shared-storage resource, or the handle of a storage location. An example of a pointer is a path name.

To ensure availability of critical shared-resources, multiple copies ("replicas") of the shared-storage resource can be maintained so that they contain identical information. Shared-storage resources mirrored in this way are referred to herein as mirrored shared-storage resources. A particular set of shared-storage resource being mirrored as replicas of each other are referred to herein as a mirrored group of shared-storage resources or as a mirrored group.

Each node in a cluster maintains a set of pointers with a pointer to each replica in a mirrored group. The set of pointers is referred to as mirrored-group pointers. When one or more replicas become unavailable, the nodes in a cluster may access another replica pointed to by a pointer from the mirrored-group pointers.

The members of a mirrored group can change. When this occurs, a message can be sent to the nodes in the cluster informing them of the change. The nodes change their local mirrored-group pointers to reflect the change.

When a change occurs in the mirrored group of a cluster, a node may not be operating or be part of the cluster and thus may never receive a message informing it of the change. When the node begins operating again as a member of the cluster, the mirrored group of pointers at the node may point to a former version of the mirrored group. It is possible that the mirrored-group pointers include a pointer that points to a shared-storage resource that is no longer being maintained as a replica, that is no longer up-to-date, and that may contain incorrect and critical information.

Based on the foregoing, there is a clear need for mechanisms to ensure that all the nodes that form a cluster have the latest and correct version of mirrored-group pointers, and that the nodes detect when a node has an incorrect version of mirrored-group pointers and that the mirrored-group pointers be corrected.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Approaches are described for detecting and correcting mirror-grouped pointers that are incorrectly configured. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Figure 1:
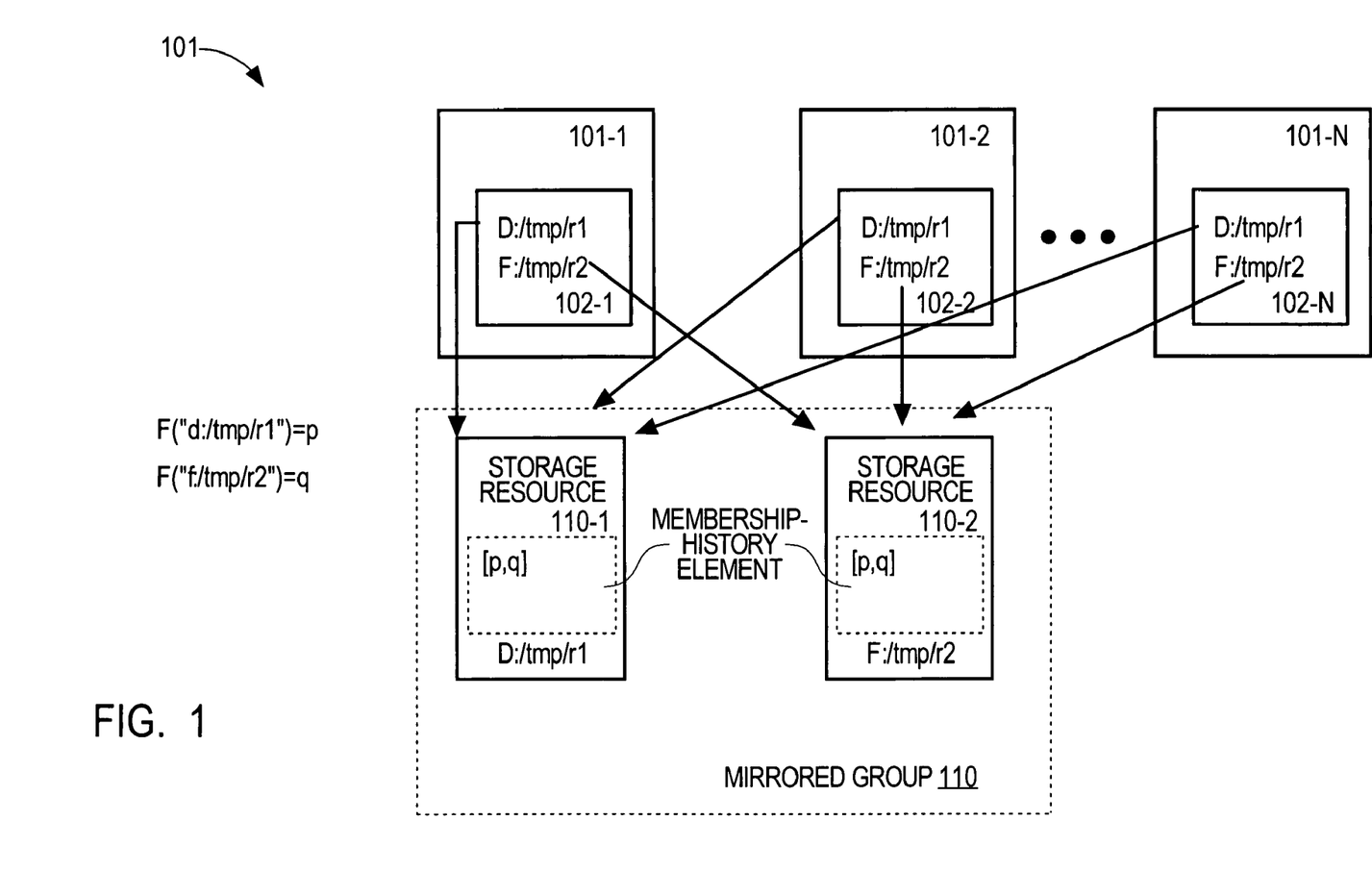
FIG. 1 is a block diagram depicting a cluster and a mirrored group of shared-storage resources according to an embodiment of the present invention.

FIG. 1 is a block diagram that shows a cluster used to illustrate an embodiment of the present invention. Referring to FIG. 1, it shows cluster 101, which contains plurality of nodes 101-1, 101-2 and 101-N. Shared-storage resources 110-1 and 110-2 are replicas that comprise mirrored group 110. Each of nodes 101-1, 101-2 and 101-N locally store mirrored-group pointers 102-1, 102-2 and 102-N, respectively. Pointers within mirrored-group pointers 102-1, 102-2 and 102-N are path strings that refer to the storage location of either shared-storage resources 110-1 and 110-2. The path string 'd:/tmp/r1' refers to shared-storage resource 110-1; 'f:/tmp/r2' refers to shared-storage resource 110-2.

According to an embodiment, each of shared-storage resources 110-1 and 110-2 is a cluster registry replica. Each replica resides on a separate storage device (e.g. disk drive) and stores items of data as hierarchically related name value pairs. Each node in cluster 101 may access (i.e. read and write) name value pairs within the cluster registry. Applications hosted by cluster 101, such as a database server, may also access the cluster registry.

Tracking History of Membership within Mirrored Group

For various reasons, the membership of mirrored group 110 may change. For example, shared-storage resource 110-1 may become inaccessible due to a media failure on the disk drive that holds shared-storage resource 110-1. Shared-storage resource 110-1 is removed from mirrored group 110 and another replica of shared-storage resource 110-2 is added to mirrored group 110 to preserve redundancy. "Member-change messages" are sent to the nodes of cluster 101 informing them of the change in membership of mirrored group 110 and the path to the new member. In response, the nodes alter their local mirrored-group pointers, removing the pointer to shared-storage resource 110-1 and adding one for the new member.

Failure of a shared-storage resource is only one example of why the membership of a mirrored group may change. For example, the administrators of cluster 101 may simply wish to change the mirrored group so that replica's of shared-storage resources placed on a storage device can be accessed more efficiently by the nodes or so that work load may be shifted between storage devices. Furthermore, after removal from the mirrored group a share-storage device may remain accessible, but would not mirror the mirrored group because it is not being maintained as a replica.

It is possible that a node in the cluster is down or is otherwise unavailable when membership change messages are transmitted, and thus are not received by the node. When the node begins running again, its mirrored-group pointers are invalid because they have not been updated and do not point to the most current version of the mirrored group. To enable the node to detect that the mirrored group has changed, the membership history of mirrored group 110 is tracked within shared-storage resources that, at least at one point in time, were members of a version of mirrored group 110. The way that tracking membership changes enables a node to make this detection shall be described in more detail later.

When membership of a mirrored group is changed to a new version, the members of the new version store a "membership stamp" within a data element of the member. A membership stamp is a value that depends on the membership of a mirrored-group, and that varies between mirrored groups with different members. Thus, membership stamp values of different mirrored groups (i.e. with different members) differ; membership stamp values of the same mirrored group are identical. By comparing membership stamps for versions of mirrored group 110, it can be determined whether the versions have the same membership.

According to an embodiment, a membership stamp is a vector having elements. Each element's value is the output of a hash function F applied to the pointer value of a member of a mirrored group. Within a shared-storage resource, the membership stamp is stored within a data element referred to as a membership-history element, or just membership-history.

The member-history elements of storage resource 110-1 and 110-2 hold the membership stamp vector [p,q]. The hash value p is the output of F('d:/temp/r1') and q is the output of F('f:/temp/r2').

When mirrored group membership is changed, cluster 101 generates a new membership stamp value based on the new version of the mirrored group and adds the value in the membership-history element of the members of the new version.

Figure 2:
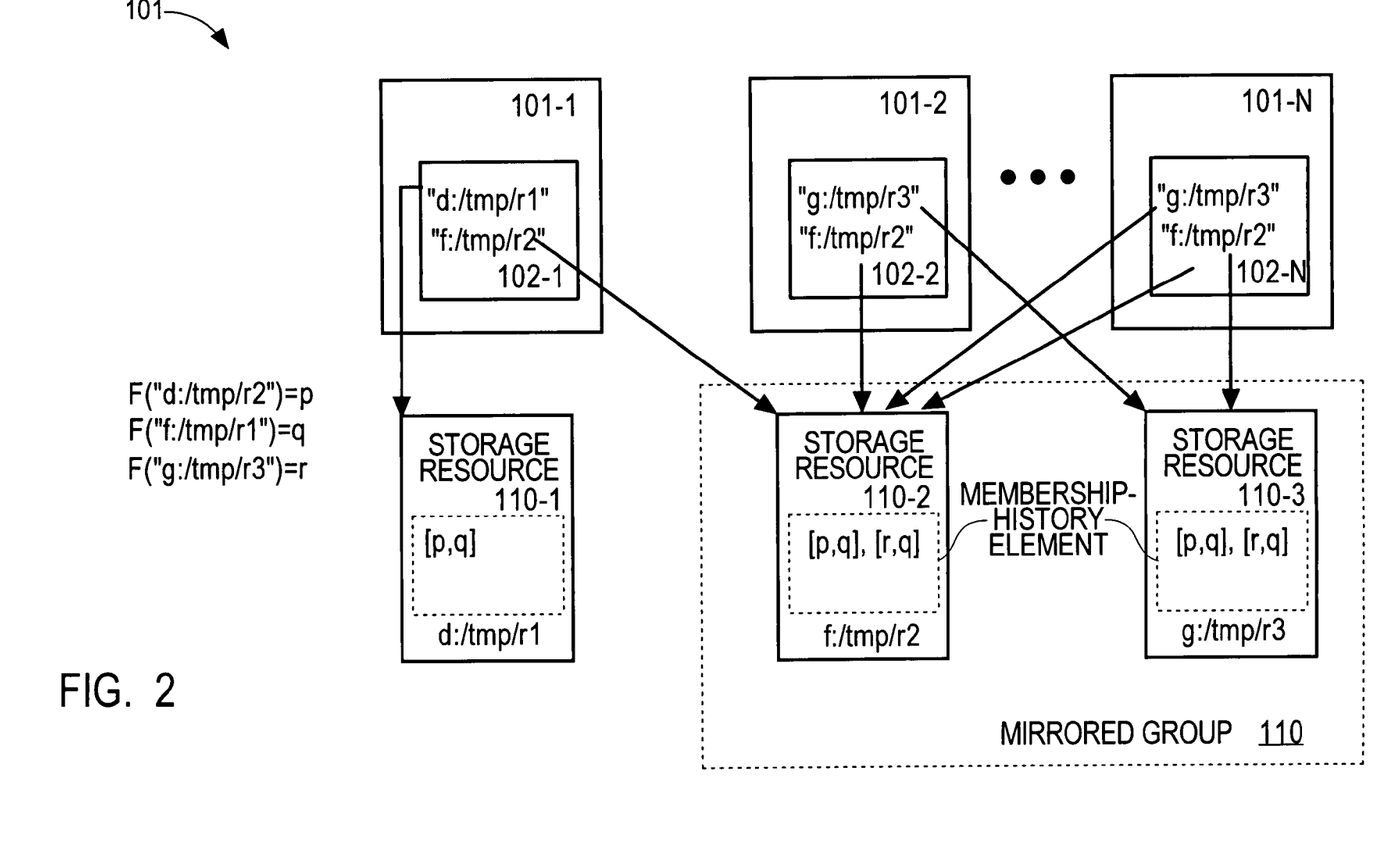
FIG. 2 is a block diagram depicting a cluster and shared-storage resources according to an embodiment of the present invention.

To illustrate this procedure, a version of cluster 101 is shown in FIG. 2 after changing the membership of mirrored group 110.

Referring to FIG. 2, shared-storage resource 110-3 has been added to mirrored group 110 and shared-storage resource 110-1 has been removed. During the change, node 1 is not running. The pointer to shared-storage resource 110-3 is 'g:/tmp/r3'. The change in membership triggered the generation of a membership stamp based on the membership of the new version of mirrored group 110 and their pointers. The hash value r is the output of F('g:/tmp/r3'); the value of the generated member stamp is [r,q].

The membership stamp is added only to the membership-history element of the members of the new version of the mirrored group. The member-history element of shared-storage resources 110-2 and 110-3 hold the sequence of membership stamps [p,q], [r,q]. The membership stamp [r,q] being the last membership stamp added to the membership-history element of shared-storage resources 110-3 and 110-2, is at the end of the sequence. The membership-history element of shared-storage resource 110-3 includes the membership stamp [p,q] in the series because when a shared-storage resource is added to a mirrored group, the state of an existing member of the mirrored group is copied to the shared-storage resource being added.

The last membership stamp added to the membership-history element of a shared-storage resource is referred to as that shared-storage resource's active membership stamp. As shown in FIG. 2, the active membership stamp of shared-storage resource 110-3 and 110-2 is [r,q]. On the other hand, the active membership stamp of shared-storage resource 110-1 is [p,q].

When the membership of mirrored group 110 was changed, membership change messages were sent. Nodes 101-2 and 101-N, which are running within cluster 101, receive the message and update their respect mirrored-group pointers accordingly. The mirrored-group pointers 102-2 and 102-N of nodes 101-1 and 101-N include values 'g:/tmp/r3' and 'f:/tmp/r2'. However, mirrored-group pointers 102-1 on node 101-1 include the original pointers to the previous version of mirrored group 110, which are 'd:/temp/r1 and 'f:/temp/r2'. Thus, when node 101-1 begins running again, it has invalid mirrored-group pointers pointing to shared-storage resource 110-1, which may or may not be accessible. Mirrored-group pointers on a node that do not point to a member of the current mirrored group and/or that point to a shared-storage resource that is not a member of the current mirrored group is referred to herein as misconfigured mirror-group pointers.

Detecting Misconfigured Mirror-Group Pointers

Figure 3:
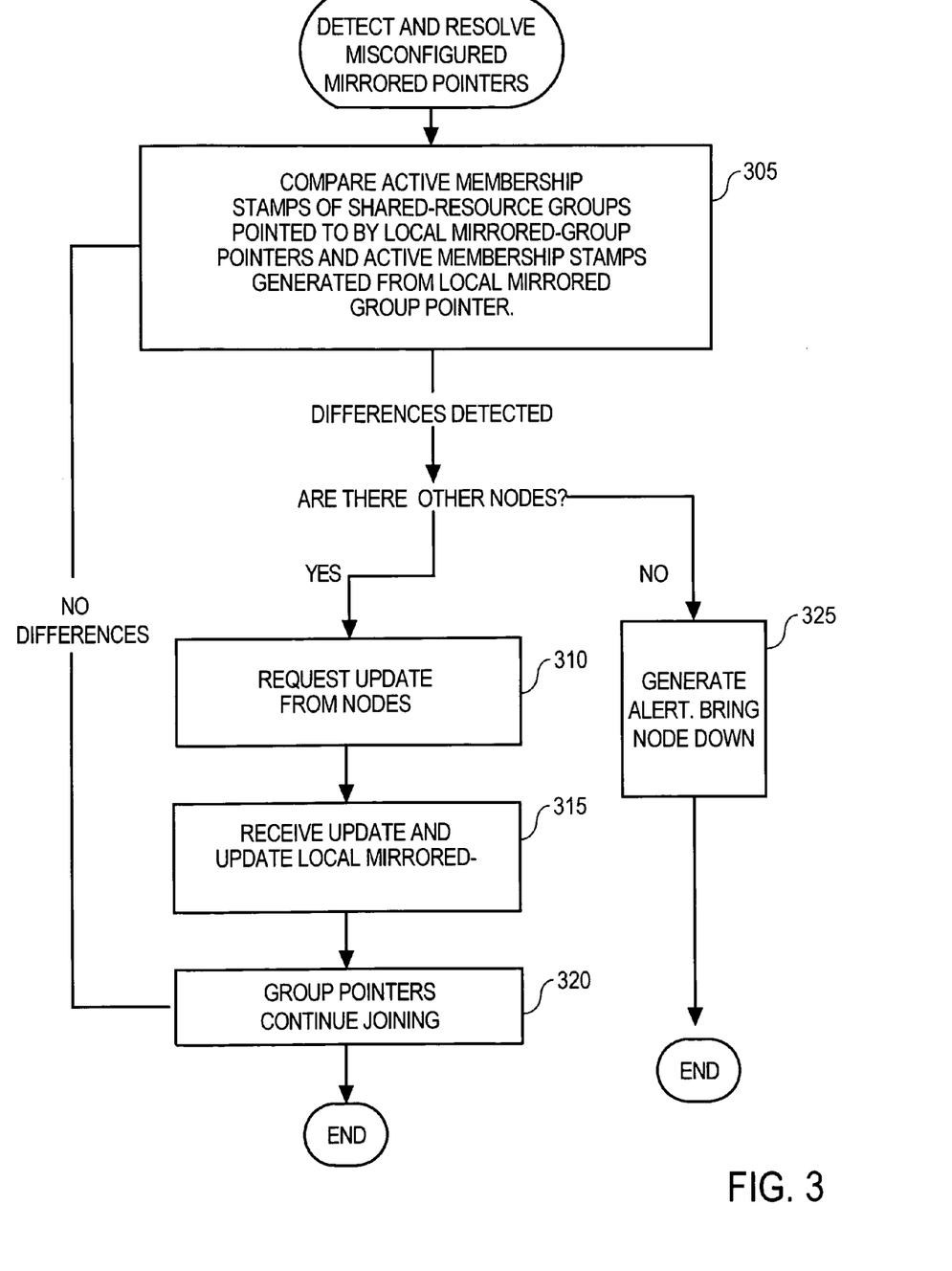
FIG. 3 is a flow chart depicting a procedure for detecting and correcting pointers that point to a group of shared resources and that are stored on a node of a cluster according to an embodiment of the present invention.

FIG. 3 shows a procedure followed to detect misconfigured mirror-group pointers. The procedure is followed by a node when it is joining a cluster. Joining a cluster refers to operations performed by a node or an application on the node to commence running as part of a cluster. Such operations include performing various checks, such as ensuring that certain processes and software are running, that certain devices or network connections are operable, and, in particular, that mirrored-group pointers refer to the latest version of a mirrored group. If any errors are encountered while joining a cluster, the node or the cluster may remedy the error, may raise an alert by signaling human operators of the cluster, may cease to continue to join the cluster, or a combination thereof.

The procedure in FIG. 3 is illustrated using cluster 101 as depicted in FIG. 2. Node 101-1 is joining cluster 101 after node 101-2 and 101-N have joined and been running within cluster 101. Referring to FIG. 3, at step 305, a node compares a membership stamp ("local membership stamp") generated based on its local mirrored-group pointers to the active membership stamps stored in the shared-storage resources pointed by the local mirrored-group pointers. In the case of node 101-1, its local membership stamp is compared to the active membership stamps stored in shared-storage resources 110-1 and 110-2. The local membership stamp is [p,q]. While this local membership stamp matches the active membership stamp of shared-storage resource 110-1, the local membership stamp does not match the active membership stamp of shared-storage resource 110-2, i.e. [p,q] does not equal [r,q].

When node 101-1 detects this inconsistency, node 101-1 determines whether there are other nodes running in cluster 101. If there are no other nodes running in cluster 101, then at step 325, an alert is generated and the joining aborted. Otherwise, execution proceeds to step 310.

At step 310, node 101-1 transmits a request to one or more of the other nodes in cluster 101 requesting pointer values to the current mirrored group 110. At step 315, node 101-1 receives the requested values 'g:/tmp/r3' and 'f:tmp/r2' and updates local mirrored group pointers 102-1. At step 320, node 101-1 continues joining cluster 101.

Note that in order for a node to correct a change in mirrored group 110 using the procedure depicted in FIG. 3, at least one member from cluster 101 should be up. This limitation is referred to herein as the one-remaining limitation. If the one-remaining limitation cannot be met when a misconfiguration is detected, then an alert can be raised and/or the node in cluster 101 can be brought down so that human operators can intervene to remedy the situation.

Finally, the hash function used to generate a membership stamp should generate the same value for pointers to the same location. According to an embodiment, this requirement may be met by using identical path strings as a pointer in the mirrored-group pointers of the nodes in a cluster.

Illustration of a Severe Case

Figure 4:
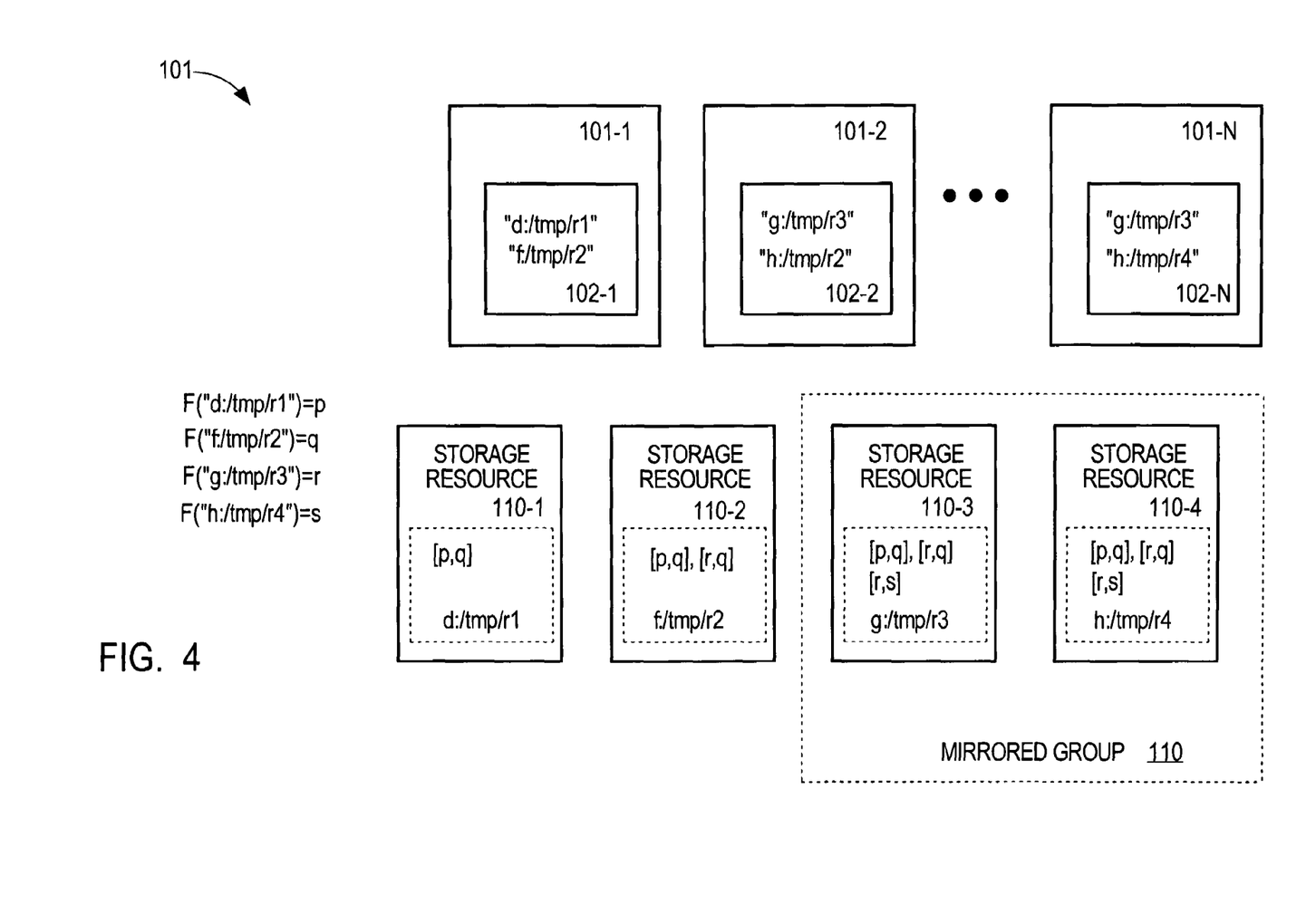
FIG. 4 is a block diagram depicting a cluster and shared-storage resources according to an embodiment of the present invention.

The following illustrative "severe-case" scenario is provided to demonstrate how adherence to the one-remaining limitation in conjunction with membership stamp comparison can detect the misconfiguration of the local mirrored-group pointers under severe circumstances. The scenario is based on cluster 101 as depicted in FIG. 1 and FIG. 4. FIG. 4 represents cluster 101 after undergoing two mirrored group changes that conform to the one-remaining limitation as follows.

While node 101-1 is down, mirror group 110 is changed by removing shared-storage resource 110-1 and adding shared-storage resource 110-3, whose pointer is 'g:/tmp/r3'. The value for the new membership stamp is [r,q], which is added to the membership-history elements of shared-storage resources 110-2 and 110-3. Next mirrored group 110 is changed again by removing shared-storage resource 110-2, adding shared-storage resource 110-4, and removing shared-storage resource 110-2. The pointer for shared-storage resource 110-3 is 'h:/tmp/r4'. The value for the new membership stamp is [r,s], which is added to the membership-history elements of shared-storage resources 110-3 and 110-4, as shown in FIG. 4.

Next, cluster 101 is brought down and then restarted. Restarting cluster 101 entails that the member nodes serially join the cluster in any order. In this case, node 101-1 is the first to join. Because node 101-1 is the first to join, no other nodes are running within cluster 101.

Next, during membership-stamp comparison, node 101-1 detects a membership-stamp inconsistency. Specifically, the local membership stamp of node 101-1 is [p,q], which does not match the active membership stamp of shared-storage resource 110-2, a shared-storage resource pointed to by local mirrored-group pointers 102-1 of node 101-1. However, since no other nodes have joined the cluster 101, there are no nodes from which to get the correct version of mirrored-group pointers. Node 101-1 thus determines that it is unable to automatically correct its local mirrored-group pointers, and raises an alert for intervention by human operators. Alternatively, node 101 can abort its join operation, wait for other nodes to join, and attempt to join again when other nodes might be able to furnish correct mirror-group pointers.

Generalized Case

Use of membership-stamp comparison to detect misconfiguration of mirrored-group pointers has been illustrated using mirrored groups that contain only two replicas of a shared-storage resource. However, membership-stamp comparison can be used to detect misconfiguration of mirrored-groups that contain more members using techniques described in Providing The Latest Version Of A Data Item From An N-Replica Set. The patent application discusses techniques for determining whether a version of a data-item replicated in a replicated set of data items is the latest version. Based on those techniques, membership-stamp comparison may be used under the following conditions.

N N is the number of replicas in a mirrored group.

X % This is the percentage of replicas that must remain when changing the membership of a mirrored group to a new version.

100%-X % The percentage of replicas that must be accessible during membership stamp comparison must be more than 100%-X %, i.e. the minimum percentage of replicas whose membership stamps must be compared to the local membership stamp during membership stamp comparison must be greater than 100%-X %.

For example, if the mirrored group contains 4 replicas and 50% is selected as X %, no fewer than 2 replicas must remain when changing the membership of a mirrored group to a new version. When performing a membership-stamp comparison, at least three replicas must be accessible.

Finally, the membership-stamp comparison technique can be used to detect a misconfiguration of mirrored-group pointers to a set that contains just one shared resource.

Hardware Overview

Figure 5:
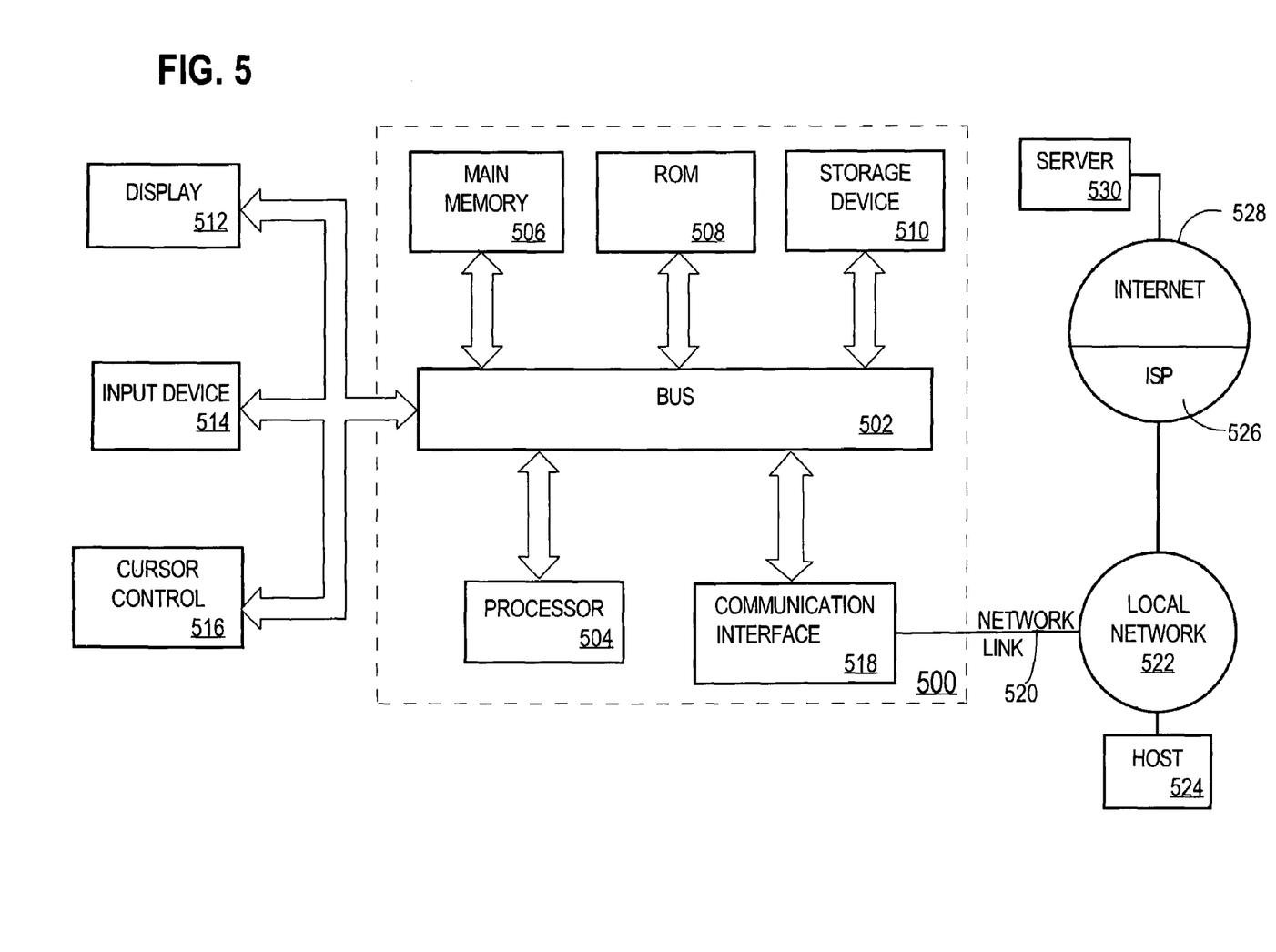
FIG. 5 is a block diagram depicting a computer system that may be used to implement an embodiment of the invention.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for handling misconfigured pointers stored on a cluster that should point to
   a shared-storage resource of the cluster, comprising:
   changing membership of a set of one or more shared-storage resources to create versions of the set;
   wherein the cluster includes a plurality of nodes that includes a first node;
   for each version of the set, generating a membership stamp that:
     is generated based on pointers to the one or more members of said each version, and
     represents the membership of said each version of the set;
   for each version of the set, storing in each member of said each version said each version's respective membership stamp;
   storing one or more pointers on the first node, said one or more pointers pointing to a certain version of the set of one or more shared-storage resources;

generating a local membership stamp based on the one or more pointers, wherein said local membership reflects the membership of the certain version of the set of one or more shared-storage resource;

making a comparison of the local membership stamp to the membership stamps stored in at least a portion of the certain version of the set; and making a determination of whether the one or more pointers point to all the members of the latest version of the set, said determination being based on one or more criteria, said one or more criteria being based on the comparison.

2. The method of claim 1, wherein the set includes N replicated shared-storage resources, wherein N is greater than or equal to two.

3. The method of claim 2, wherein the one or more criteria include:

changing membership of the set removes no more than X % members, and the certain set includes a number of members that is greater than 100%-X % members.

4. The method of claim 1, wherein the steps further include, in response to determining that one or more pointer do not point to all the members of the latest version of the set, said first node automatically changing the one or more pointers to point to the latest version of the set.

5. The method of claim 4, wherein:

the steps further include transmitting messages to other nodes in the cluster requesting information about the membership of the latest version of the set;

receiving the information requested; and changing the one or more pointers is based on the information received.

6. The method of claim 1, wherein storing in each member of said each version said each version's respective membership stamp includes storing in a particular member the respective membership stamp along with a previously generated membership stamp of a previous version of the set.

7. The method of claim 1, wherein each membership stamp generated for a version is generated by applying a hash function to a particular pointer to a shared-storage resource.

8. The method of claim 7, wherein the particular pointer is a path string.

9. The method of claim 1, wherein each member of each of version of the set is a cluster registry for the cluster.

10. A computer-readable medium carrying one or more sequences of instructions which, when executed by one or more processors, causes the one or more processors to perform the method recited in claim 1.

11. A computer-readable medium carrying one or more sequences of instructions which, when executed by one or more processors, causes the one or more processors to perform the method recited in claim 2.

12. A computer-readable medium carrying one or more sequences of instructions which, when executed by one or more processors, causes the one or more processors to perform the method recited in claim 3.

13. A computer-readable medium carrying one or more sequences of instructions which, when executed by one or more processors, causes the one or more processors to perform the method recited in claim 4.

14. A computer-readable medium carrying one or more sequences of instructions which, when executed by one or more processors, causes the one or more processors to perform the method recited in claim 5.

15. A computer-readable medium carrying one or more sequences of instructions which, when executed by one or more processors, causes the one or more processors to perform the method recited in claim 6.

16. A computer-readable medium carrying one or more sequences of instructions which, when executed by one or more processors, causes the one or more processors to perform the method recited in claim 7.

17. A computer-readable medium carrying one or more sequences of instructions which, when executed by one or more processors, causes the one or more processors to perform the method recited in claim 8.

18. A computer-readable medium carrying one or more sequences of instructions which, when executed by one or more processors, causes the one or more processors to perform the method recited in claim 9.

* * * * *

UNITED STATES PATENT AND TRADEMARK OFFICE
CERTIFICATE OF CORRECTION

| | | |
|---|---|---|
| PATENT NO. | : 7,437,426 B2 | Page 1 of 1 |
| APPLICATION NO. | : 11/237191 | |
| DATED | : October 14, 2008 | |
| INVENTOR(S) | : Joshi et al. | |

It is certified that error appears in the above-identified patent and that said Letters Patent is hereby corrected as shown below:

In column 5, line 21, delete "'f:tmp/r2'" and insert -- 'f:/tmp/r2' --, therefor.

In column 9, line 23, in claim 4, after "that" insert -- the --.

In column 9, line 23, in claim 4, delete "pointer" and insert -- pointers --, therefor.

In column 10, line 3, in claim 9, delete "each of" and insert -- each --, therefor.

Signed and Sealed this

Thirteenth Day of April, 2010

David J. Kappos
*Director of the United States Patent and Trademark Office*